T. D. FUTCH.
NUT SHELLER.
APPLICATION FILED APR. 21, 1919.
1,330,442.
Patented Feb. 10, 1920.
2 SHEETS—SHEET 1.
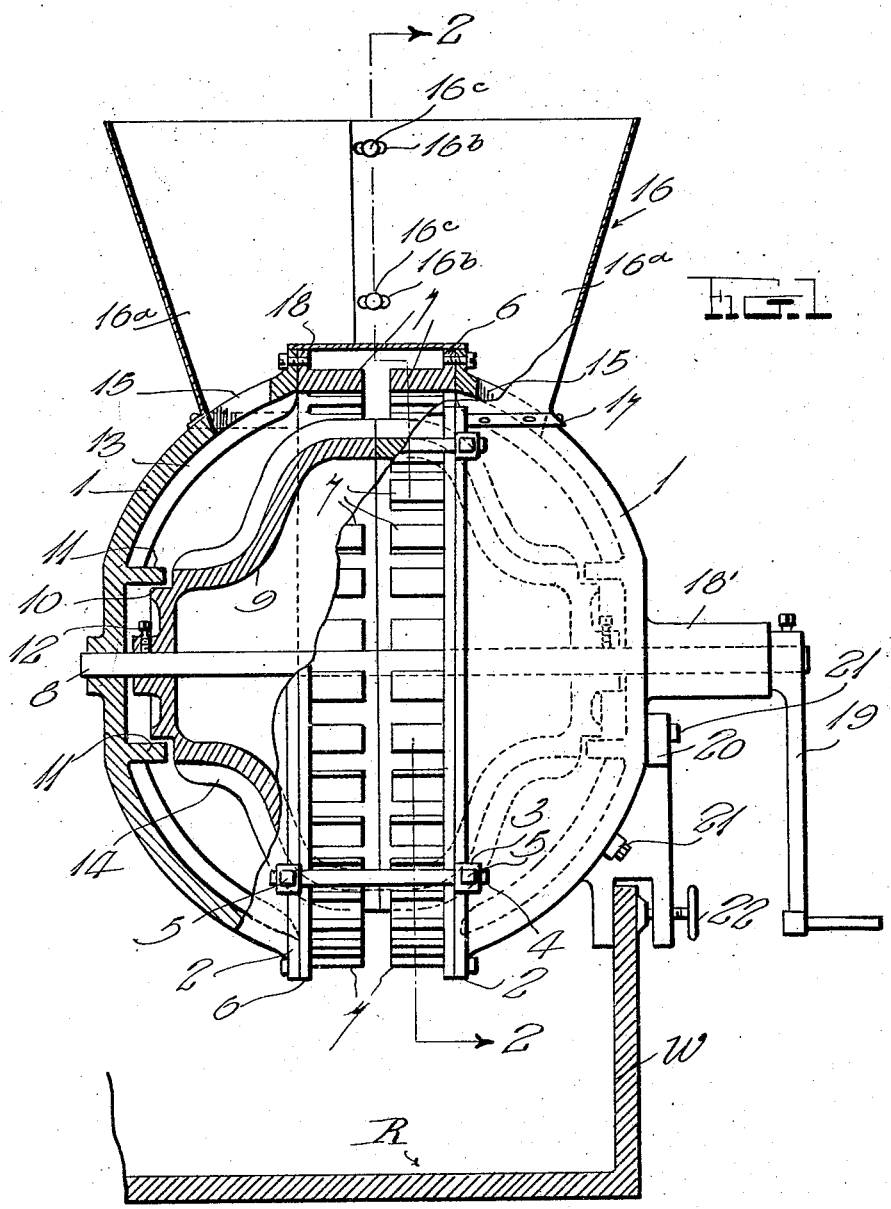
Witness
H. Woodard
Inventor
T. D. Futch
By H. R. Wilson &co
Attorneys T. D. FUTCH.
NUT SHELLER.
APPLICATION FILED APR. 21, 1919.
1,330,442.
Patented Feb. 10, 1920.
2 SHEETS—SHEET 2.
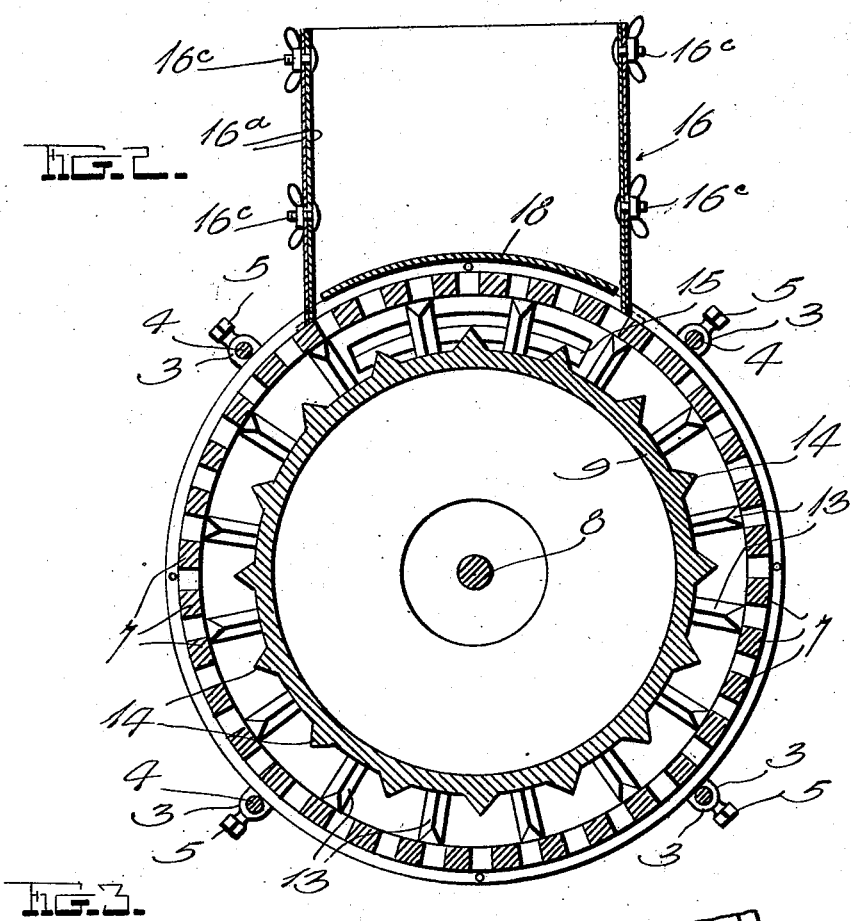
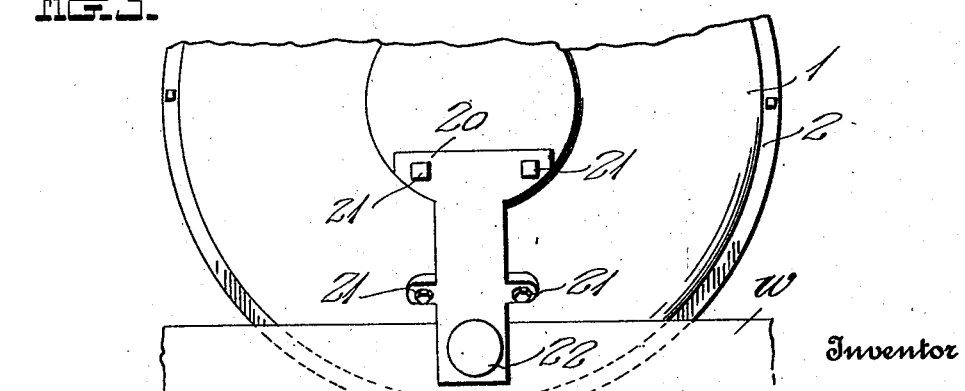
Witness
H. Woodard
Inventor
T. D. Futch,
By H. B. Wilson &co
Attorneys

UNITED STATES PATENT OFFICE.

THURSTON D. FUTCH, OF COLUMBUS, GEORGIA.

NUT-SHELLER.

1,330,442.  Specification of Letters Patent.  Patented Feb. 10, 1920.

Application filed April 21, 1919. Serial No. 291,426.

*To all whom it may concern:*

Be it known that I, THURSTON D. FUTCH, a citizen of the United States, residing at Columbus, in the county of Muscogee and State of Georgia, have invented certain new and useful Improvements in Nut-Shellers; and I do declare the following to be a full, clear, and exact description of the invention, such as will enable others skilled in the art to which it appertains to make and use the same.

This invention relates to improvements in nut shellers, the primary object being to provide a simple and efficient means for rapidly shelling peanuts, almonds, or other comparatively soft shell nuts.

Another object is to provide a device of this character whose use is not limited to nuts of one size but may be adjusted according to the size of the nuts to be shelled.

With these and other objects in view, the invention resides in certain novel features of construction and in unique combinations of parts to be hereinafter fully described and claimed, the descriptive matter being supplemented by the accompanying drawing wherein:

Figure 1 is a side elevation of the nut sheller, a portion thereof being shown in section to show the arrangement of shelling ribs.

Fig. 2 is a vertical transverse sectional view taken on the line 2—2 of Fig. 1.

Fig. 3 is an enlarged side elevation of the supporting clamp and associated parts.

The sheller comprises a casing which includes a pair of substantially cup-shaped halves 1, each having an outwardly extending rim or flange 2 thereon, said rim or flange being formed with a number of circumferentially spaced lugs 3, through which project connecting rods 4, as illustrated in Figs. 1 and 2 of the drawings. The aforementioned cup-shaped casing halves are spaced apart by the rods 4 and are adjustable toward and from each other by first loosening set screws 5 in the lugs 3, then shifting said halves along the rods to the desired point, and finally tightening said set screws.

Although I may form nut shelling means integral with the rims or flanges 2, I preferably provide rings 6 which are secured to said rims or flanges by screws or other fastening means, said rings having inwardly extending gratings, shown as formed of longitudinally directed fingers 7 formed integrally with the aforesaid rings. The two sets of fingers are separated the distance required by the particular size of nuts to be shelled, and said fingers are moved toward or from each other with the adjustment of the casing halves.

The cup-shaped casing halves 1 are provided with longitudinally alined bearing openings, receiving a shaft 8 which carries a hollow rotor 9, preferably made in two half sections. The diameter of the rotor is greatest at its central portion which is located adjacent the rims 2 of the cup-shaped casing halves from which portion its wall is curved inwardly toward the shaft and upon reaching points adjacent said shaft is extended longitudinally. The opposite ends of the rotor are provided with reduced portions 10 received in sockets formed by annular inwardly directed flanges 11 which surround the bearing openings of the casing halves. The rotor ends are further reduced and provided with threaded apertures for set screws 12 which secure said rotor to the shaft. The flanges 11 prevent nuts or their shells, from wedging into the space between the rotor and the casing. Longitudinally extending shell crushing ribs 13 are formed on the inner faces of the cup-shaped casing halves 1 and extend from the flanges 11 to the rims of said halves, and are adapted to coöperate with similarly formed ribs 14 extending the full length of the rotor 9, as clearly illustrated in Fig. 1 of the drawings. The space between the ribs on the casing and those on the rotor decreases from points near the flanges 11 to the rims of the cup-shaped casing halves 1 so that the nuts will wedge themselves between said ribs as they gravitate to the bottom of the casing, and the rotation of the rotor will break the shells, removing them from the kernels.

Inlet openings 15 are provided in the upper sides of the casing halves 1 to receive therethrough the nuts to be shelled. For the purpose of directing the nuts into the inlet, a suitable hopper 16 is mounted on the casing halves, said hopper being formed in two sections 16ª secured to the cup-shaped casing halves so as to be adjustable with said halves. The sides of the sections 16ª overlap and are preferably provided with alined slots 16ᵇ for the reception of clamping bolts 16ᶜ having wing nuts which are tightened when the sections are suitably adjusted. Although other suitable means may be employed for mounting the hopper sections 16ª on the casing halves, 1, I preferably secure them with screws or like fasteners passing through flanges 17 on the lower ends of said sections.

An arcuate cover plate 18 is disposed in the bottom of the hopper for the purposes of preventing any possibility of the nuts entering between the two casing halves 1 instead of through the inlets 15 provided for that purpose.

One of the casing halves 1 may be provided with a longitudinally extending bearing boss 18' formed integrally therewith and receiving one end of the shaft 8, which end carries an operating crank 19 as illustrated in Fig. 1.

The machine is adapted to be supported on one wall W of a receptacle R by means of a clamp which may well be formed from an elongated rectangular block 20 which is secured to the casing by screws or like fasteners 21. The block 20 has a notch to receive one edge of the wall W and a clamping screw 22 is provided for clamping the device securely upon said wall.

By providing the detachable rings 6 carrying the fingers 7 or other forms of gratings, gratings having different sized openings may be used, according to the size of the nuts to be shelled, and whenever required, the two casing halves and their respective hopper sections 16ª may be adjusted toward or away from each other to place the machine in proper condition for operation. After the adjustment, the set screws 5 and the bolts 16ᶜ are of course tightened. The nuts are now dumped into the hopper 16 and enter the casing through the inlet openings 15, and due to the novel shape of the rotor 9, the nuts will wedge between the enlarged central portion thereof and the casing, as they gravitate to the bottom of the latter, and the action of the ribs 13 and 14, and the gratings 7, will remove the nuts from the kernels, the discharge of both shells and kernels taking place through and between the gratings, into the receptacle R, which receptacle may of course be in the form of an ordinary box. It may be further stated that the device may be clamped upon any other form of support if desired and a suitable receptacle used merely to receive the discharged nuts and shells.

The device is extremely simple and inexpensive, yet is highly efficient and in every way desirable, and since probably the best results are obtainable from the details disclosed, they may well be followed. It is to be understood however that within the scope of the invention as claimed, numerous minor changes may well be made.

I claim:

1. In a shelling device of the class described, a casing formed of two cup-shaped halves having their rims spaced apart, gratings carried by said rims and extending inwardly toward each other, a rotor in said casing, and co-acting shelling means on the casing wall and said rotor.

2. A structure as specified in claim 1, said gratings consisting of spaced fingers extending from said rims of said casing sections.

3. In a shelling device of the class described, a casing formed of two cup-shaped halves having their rims spaced apart, gratings removably secured to said rims and extending toward each other, a rotor in said casing, and co-acting shelling means on said rotor and the casing wall.

4. A structure as specified in claim 3, said gratings each consisting of a ring and fingers extending laterally therefrom, the rings of said gratings being secured to said rims.

5. In a shelling device of the class described, a casing formed of two cup-shaped halves having rims spaced apart, means whereby said casing halves may be adjusted toward and away from each other, gratings carried by said rims of said casing halves and adjustable bodily therewith, and a rotor in said casing.

6. A structure as specified in claim 5, said adjusting means consisting of lugs on the two casing halves, having alined openings, tie rods passing slidably through said openings, and means for holding said lugs in adjusted position on said rods.

7. In a shelling device of the class described, a casing formed of two cup-shaped halves having their rims spaced apart and provided with gratings, a rotor in said casing, co-acting shelling means on said rotor and the casing wall, means whereby the two casing halves may be adjusted toward and away from each other, and a hopper mounted on said casing and formed of sections adjustable bodily with said casing halves, the upper side of said casing having an inlet opening communicating with said hopper.

8. A structure as specified in claim 7, the sides of said hopper sections overlapping each other and having slots, and clamping bolts passing through said slots.

9. In a shelling device of the class described, a casing formed of two cup-shaped halves having their rims spaced apart and provided with gratings, the top of said casing having a hopper and an inlet opening communicating therewith, a cover plate extending over the space between the two casing rims and located in said hopper, and nut shelling means in said casing.

10. A structure as specified in claim 9, said casing halves being adjustable toward and away from each other, said hopper being formed of sections adjustable bodily with said casing halves, and said cover plate resting slidably on said casing halves to permit free adjustment of the latter.

In testimony whereof I have hereunto set my hand.

THURSTON D. FUTCH.